March 28, 1961 W. L. JACKSON 2,976,700
SEAT STRUCTURE
Filed May 14, 1958
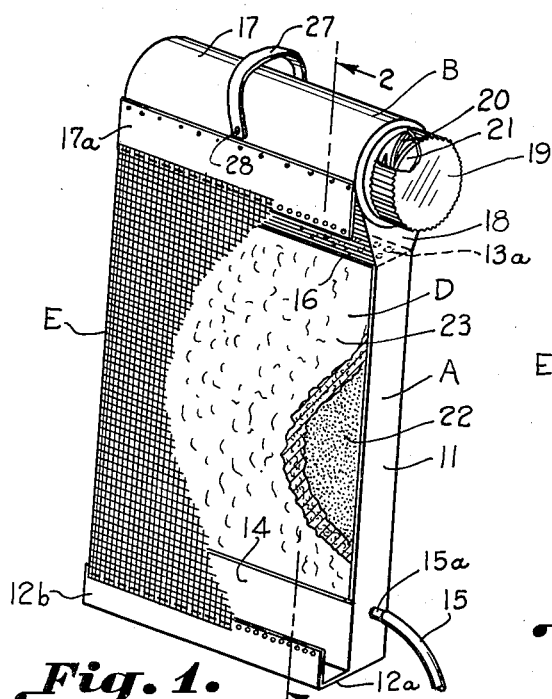
Fig. 1.
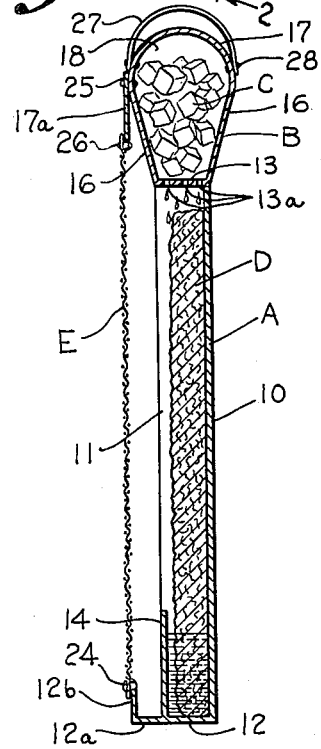
Fig. 2.
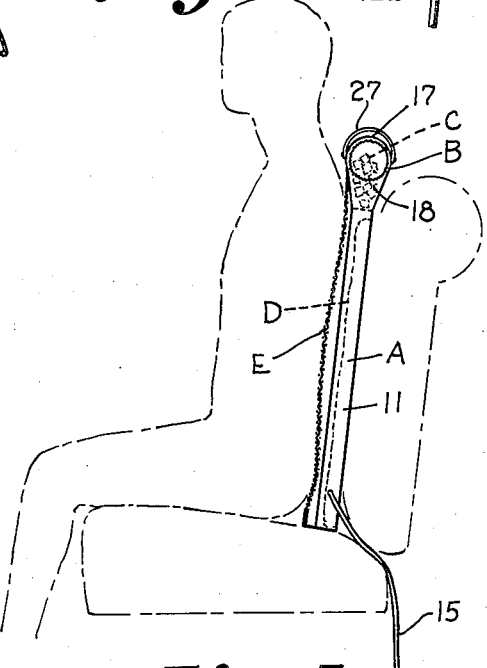
Fig. 3.
INVENTOR.
W. L. JACKSON
BY 
ATTORNEY United States Patent Office 2,976,700
Patented Mar. 28, 1961

2,976,700

SEAT STRUCTURE

William L. Jackson, 101 Argonne Drive, Greenville, S.C.

Filed May 14, 1958, Ser. No. 735,341

2 Claims. (Cl. 62—313)

This invention relates to an improved seat structure and more specifically to a seat structure having cooling means which is received by a wicking element having an exposed surface so as to provide a relatively large cooling area.

Many efforts have been made in the past to promote the comfort of individuals who must remain seated in automobiles or in stadiums and the like for prolonged periods of time during hot weather or in heated spaces. These devices vary in complexity from structures employing refrigeration coils within the seat structure to relatively simple back rests and the like employing coarsely woven coverings which promote the circulation of air adjacent the portion of the structure contacted by the user. These devices have either proved too complicated and expensive to be practical or relatively ineffective due to the limitations inherent in the structures. In the case of structures depending upon an open or coarsely woven surface, these structures prove to be of limited effectiveness because of the heated condition of the air which flows adjacent the open covering of the seat. The more complicated devices, such as those which employ artificial cooling units such as the refrigeration coils referred to above, are limited in that they are not portable and do not afford sufficient versatility to enable them to be used in the variety of situations in which such structures are desirable.

Accordingly, it is an important object of this invention to provide a portable seat structure which makes use of an artificial coolant for promoting the comfort of the user.

Another object of this invention is the provision of seat structure which is portable and which is versatile enough for use in passenger vehicles and with stadium seats and the like.

Another object of this invention is the provision of seat structure which is portable and which embodies the use of a coolant fluid which is absorbed by a wicking element which has an exposed surface which is capable of providing a cooled surface of substantial size.

A further object of this invention is the provision of seat structure which is simple and which may be of a unitary design so as to be portable and adapted to a variety of uses.

Still another object of this invention is the provision of a seat structure which may be of unitary and simple design which includes a container for ice, a wicking agent for receiving cool water as the ice melts so as to provide a cooling surface of substantial size which is provided with a foraminous or perforate cover for separating the cooling surface from direct contact with the user.

Some of the methods provided to carry out the invention will be hereinafter described.

The invention will be more readily understood from a reading of the following description and by reference to the accompanying drawings forming a part thereof wherein some illustrative examples of the invention are shown and wherein:

Figure 1 is a perspective view of a seat structure constructed in accordance with the present invention with parts broken away for clarity of illustration, Figure 2 is an enlarged transverse sectional view taken on line 2—2 in Figure 1, Figure 3 is a side elevation at a reduced scale showing seat structure constructed in accordance with the present invention in use with an automobile seat and the like, and Figure 4 is a perspective view at a slightly reduced scale showing a modified form of the invention.

Referring more particularly to the drawing, Figures 1, 2 and 3 show an embodiment of the invention which includes a relatively shallow imperforate frame or support for the back of a user A which carries a container B for storing a coolant, in this case the coolant being in the form of ice C which is in the process of melting. A flat wicking element D is carried by the frame A and communicates with the container B so that liquid from the container B may be received by the wicking element D. The wicking element D has a relatively large exposed surface on one side thereof and a perforate portion E is provided to cover the exposed surface of the wicking element D and is sufficiently spaced therefrom so as to prevent direct contact by the user with the exposed surface of the wicking element D. The increased cooling effect is thus provided by taking advantage of the cooling due to evaporation as well as the low temperature of the liquid coolant.

The relatively shallow imperforate frame A includes a substantially rectangular back portion 10 and a pair of sides 11. The frame A further includes a bottom portion 12 which is relatively shallow and a corresponding top portion 13 having a plurality of apertures 13a therein for providing communication between the container B and the frame A so that the liquid coolant in the form of melted ice may be received by the wicking element D.

As the ice C contained within the container B melts it is received by the wicking element D and carried to a receptacle formed therefor by a front plate 14 which is preferably integral with the back portion 10, and the sides 11 and bottom 12. Preferably the frame A and all the parts directly associated therewith are of integral construction of a polyethylene material. While the frame A may be constructed of any suitable material, it is preferable that the frame be constructed of a material having relatively low thermal conductivity so as to prevent the formation of moisture on the outside of the frame A. If desired, a tube 15 may be provided near the top of the front plate 14 communicating with the tray A through one of the sides 11 by a suitable fitting 15a for removing excess water through the floor of the vehicle or into another container or directly upon the ground or floor.

The container B for storing a liquid coolant is preferably carried by the upper portion of the frame A integrally with the upper portion 13, the sides 11 and back 10. The container includes sides 16 which diverge upwardly and which are provided with a rounded top 17 preferably integral therewith. The container B is provided with end portions 18 preferably integral with the sides 16 and the top 17 to form a closed container. Access may be had to the container B for filling the same with ice C by opening the closure or cap 19 which is threadably carried by an annular flange 20 which defines an aperture 21 in one of the end portions 18 of the container B. Means of obtaining access to the container B other than that described may be provided if desired.

The wicking agent or sponge-like element D is preferably constructed from cellulose material having both horizontal and vertical wicking action; however, any suitable material may be employed which is capable of receiving and storing coolant. It has been found in practice that mechanical fastenings means are suitable for securing the wicking element D within the frame A; however, it is preferred that an adhesive 22 of any of the well known types which is substantially unaffected by contact with the coolant and which will adhere both to the tray A and the wicking element D be employed to cover the inside of the back 10 so as to secure the wicking element D thereto. This prevents warping of the wicking element D and makes a reasonably smooth exposed surface 23 of substantial size.

The perforate portion E is secured adjacent the bottom of the tray A by an extension of the bottom 12 shown at 12a in the drawing having a vertical front portion 12b to which the perforate cover portion E is secured by suitable fastenings such as rivets 24. The perforate cover E is carried by the container C adjacent the top by a plate 17a which is attached by suitable means such as rivets 25 to the sides 16 of the container C, the perforate cover E being secured adjacent the bottom of the plate 17a by suitable means such as rivets 26. The cover E may be constructed by any suitable foraminous material but is preferably constructed of flexible material as shown.

A pivoted handle 27 is provided to assist in the carrying of the seat structure and is shown pivoted to the container B on each side thereof as at 28. Figure 3 shows the seat structure in operable position in connection with an automobile seat and the like which is shown in broken lines. The position of the user is also shown in broken lines and it will be noted that the wicking element D is of substantial size so as to provide cooling over a relatively large area.

Figure 4 shows a modified form of the invention in which like reference characters are used to designate like parts of the embodiment shown in Figures 1, 2 and 3 with prime notations added. A substantially rectangular second frame 29 having sides 29a, a top 29b and a bottom 29c is shown preferably constructed of wood. The top of the frame 29b is secured to the container B' preferably by a suitable adhesive while the bottom portion 29c is shown secured also by a suitable adhesive to the extension 12a' of the bottom 12'. The flexible cover E' is shown constructed of woven bamboo and the like but may be of a flexible coarsely woven textile material as is the cover portion E shown in the Figures 1, 2 and 3. The cover E may be carried by a separate frame (not shown) which need not be fixed to the frame A but which is carried thereby when in use.

The foregoing disclosure and description of the invention is illustrative and explanatory thereof and changes and variations will occur of those skilled in the art which may be made within the scope of the appended claims without departing from the spirit of the invention.

What is claimed is:

1. A seat structure including, a container for storing a liquid coolant, a relatively shallow imperforate frame having connection with said container, a flat wicking element carried by said frame communicating with said container so that liquid from said container may be received by the wicking element, said wicking element having an exposed surface on one side thereof, a second frame carried by the above mentioned frame, and a perforate portion carried by the second frame in the spaced relation to the exposed surface of the wicking element to prevent direct contact of the user with the exposed surface of the wicking element.

2. A seat structure including, a container for storing a liquid coolant, a relatively shallow imperforate support for the back of a user having connection with said container, a flat wicking element carried by said support communicating with said container so that liquid from said container may be received by the wicking element, said wicking element having an exposed surface on one side thereof, a frame carried by the above mentioned support, and means carried by the frame in the spaced relation to the exposed surface of the wicking element to prevent direct contact of the user with the exposed surface of the wicking element.

References Cited in the file of this patent

UNITED STATES PATENTS

| | | |
|---|---|---|
| 594,209 | Mears | Nov. 23, 1897 |
| 881,121 | Hodgins | Mar. 10, 1908 |
| 1,056,964 | Amsbary | Mar. 25, 1913 |
| 1,191,309 | Hudson | July 18, 1916 |
| 2,636,371 | Stephens | Apr. 28, 1953 |
| 2,722,266 | Kersten | Nov. 1, 1955 |